(12) United States Patent
Park et al.

(10) Patent No.: US 11,988,228 B2
(45) Date of Patent: May 21, 2024

(54) AIR COMPRESSOR FOR VEHICLE

(71) Applicant: Hanon Systems, Daejeon (KR)

(72) Inventors: Gun Woong Park, Daejeon (KR); Chi Yong Park, Daejeon (KR); Jong Sung Lee, Daejeon (KR); Kyu Sung Choi, Daejeon (KR)

(73) Assignee: Hanon Systems, Daejeon (KR)

( * ) Notice: Subject to any disclaimer, the term of this patent is extended or adjusted under 35 U.S.C. 154(b) by 0 days.

(21) Appl. No.: 17/641,850

(22) PCT Filed: Sep. 29, 2020

(86) PCT No.: PCT/KR2020/013323
§ 371 (c)(1),
(2) Date: Mar. 10, 2022

(87) PCT Pub. No.: WO2021/071169
PCT Pub. Date: Apr. 15, 2021

(65) Prior Publication Data
US 2022/0403854 A1      Dec. 22, 2022

(30) Foreign Application Priority Data

Oct. 10, 2019   (KR) ........................ 10-2019-0125388

(51) Int. Cl.
*F04D 29/58*      (2006.01)
*F04D 25/06*      (2006.01)
(Continued)

(52) U.S. Cl.
CPC ........... *F04D 29/582* (2013.01); *F04D 25/06* (2013.01); *F04D 29/02* (2013.01); *F04D 29/057* (2013.01);
(Continued)

(58) Field of Classification Search
CPC ...... F04D 25/06; F04D 29/057; F04D 29/582; F04D 29/584; F04D 29/588
See application file for complete search history.

(56) References Cited

U.S. PATENT DOCUMENTS

| | | | | |
|---|---|---|---|---|
| 5,795,138 A | * | 8/1998 | Gozdawa | .............. F04D 29/063 |
| | | | | 417/423.12 |
| 10,962,050 B2 | * | 3/2021 | Lee | ..................... F04D 29/5806 |
| 2022/0403854 A1 | * | 12/2022 | Park | ........................ F16C 32/06 |

FOREIGN PATENT DOCUMENTS

| | | | | |
|---|---|---|---|---|
| CN | 108252956 A | * | 7/2018 | |
| DE | 4440495 A1 | * | 5/1996 | .............. F01N 3/32 |

(Continued)

OTHER PUBLICATIONS

Machine translation of KR 20180118455 A (Oct. 31, 2018) (Year: 2018).*

(Continued)

*Primary Examiner* — Christopher R Legendre
(74) *Attorney, Agent, or Firm* — Norton Rose Fulbright US LLP; James R. Crawford

(57) ABSTRACT

Air compressor for a vehicle having improved internal cooling efficiency by ensuring a circulation flow of compressed air for internal cooling and allowing the compressed air to sufficiently flow. The air compressor comprises: a housing with a compression unit for introducing and compressing air from outside; a motor unit which includes a rotor and a stator, and drives the compression unit to rotate according to the rotation of the rotor; a bearing unit supporting the rotor to be rotatable; a cooling circulation flow path formed inside the housing for moving, in an axial direction, some of the air compressed in the compression unit and circulating the air to the compression unit; and a bypass flow path which receives some of the air passing through the cooling circulation flow path and bypasses a (Continued)

partial region of the bearing unit to join the cooling circulation flow path.

13 Claims, 7 Drawing Sheets

(51) Int. Cl.
    *F04D 29/02*       (2006.01)
    *F04D 29/057*     (2006.01)
    *F04D 29/063*     (2006.01)
    *F04D 29/42*       (2006.01)
    *F16C 32/06*       (2006.01)
    *F16C 37/00*       (2006.01)

(52) U.S. Cl.
    CPC ....... *F04D 29/063* (2013.01); *F04D 29/4206* (2013.01); *F16C 32/06* (2013.01); *F16C 37/002* (2013.01)

(56) References Cited

FOREIGN PATENT DOCUMENTS

| FR | 2973846 A1 | * | 10/2012 | ........ A61M 16/0066 |
|----|------------|---|---------|----------------------|
| JP | 2018150892 A | | 9/2018 | |
| KR | 100962903 B1 | | 6/2010 | |
| KR | 20170061497 A | | 6/2017 | |
| KR | 20170061507 A | | 6/2017 | |
| KR | 20170128823 A | | 11/2017 | |
| KR | 101847165 B1 | * | 4/2018 | |
| KR | 20180118455 A | | 10/2018 | |
| KR | 2019002972 A | | 1/2019 | |
| KR | 102002729 B1 | | 7/2019 | |
| KR | 20190130936 A | * | 11/2019 | |
| KR | 20200056294 A | | 5/2020 | |
| KR | 20210117686 A | * | 9/2021 | |
| KR | 20220057086 A | * | 5/2022 | |
| WO | WO-2022211158 A1 | * | 10/2022 | ........... F04D 29/056 |

OTHER PUBLICATIONS

International Search Report issued in PCT/KR2020/013323 dated Jan. 12, 2021.

Korean Office Action dated Feb. 19, 2024, issued for the corresponding Korean patent application KR 10-2019-0125388, with english translation.

* cited by examiner

AIR COMPRESSOR FOR VEHICLE

CROSS-REFERENCE TO RELATED APPLICATIONS

The present application is a United States national phase under 35 U.S.C. § 371 of International Patent Application No. PCT/KR2020/013323 filed Sep. 29, 2020, which claims the benefit of priority from Korean Patent Application No. 10-2019-0125388 filed Oct. 10, 2019, each of which is expressly incorporated herein by reference in its entirety.

TECHNICAL FIELD

The present invention relates to a compressor, and more particularly, to an air compressor for a vehicle, in which cooling efficiency is improved by increasing a circulation flow rate of cooling air.

BACKGROUND ART

Generally, a fuel cell vehicle is a vehicle in which hydrogen and oxygen are supplied to a humidifier so that electrical energy generated through electrochemical reaction that is a reverse reaction of water electrolysis is supplied as a driving force of the vehicle. A general fuel cell vehicle is disclosed in Korea Patent Registration No. 0962903.

Generally, fuel cell vehicles for riding include a 100 kW fuel cell stack. Here, when the fuel cell stack is operated while pressurized, air supplied to the fuel cell stack is supplied at a high pressure of 1 to 4 bars. To this end, it is necessary to use an air compressor having a speed of 100 thousand to 200 thousand revolutions per minute (RPM).

A fuel cell vehicle generally includes a fuel cell stack configured to generate electricity, a humidifier configured to increase humidity of air supplied to the fuel cell stack, a fuel supply portion configured to supply hydrogen to the fuel cell stack, an air supply portion configured to supply air including oxygen to the fuel cell stack, a cooling module configured to cool the fuel cell stack, and the like.

The air supply portion includes an air cleaner configured to filter out foreign matter included in air, an air compressor configured to compress and supply the air filtered by the air cleaner, a cooling device configured to cool high-temperature pressurized air, a humidifier configured to increase humidity in air, and a valve configured to adjust a flow rate.

The air compressor compresses air suctioned from the outside using a compressor impeller and then sends the compressed air to the fuel cell stack.

Here, the compressor impeller is connected to a rotating shaft which receives power from the driving portion, and the driving portion generally drives the rotating shaft through electromagnetic induction of a stator and a rotor.

Here, in the air compressor, heat loss caused by air resistance at an air bearing occurs due to high-speed rotation of the rotor, and thus it is necessary to cool a motor and a bearing that are main heat sources. Hence, there is provided a structure which cools the motor and bearing for rotating the impeller by utilizing some of the compressed air produced by the impeller of the air compressor and then introduces the air into an inlet side of the impeller through an internal hole of a rotating shaft of the motor.

Relevantly, Korean Patent Registration No. 1810430 discloses an air compressor in which an internal air flow is circulated using an end of a motor shaft and a fuel cell vehicle. Here, the air compressor includes a driving housing in which a rotor and a stator are built, a motor shaft in which an air discharge hole is formed through the driving housing, an air bearing coupled to a housing rear end of the driving housing to support a shaft rear end of the motor shaft, and a motor cooling path in which cooling air collected in an external chamber of the motor via an internal space of the driving housing is extracted from compressed air formed by an impeller in an impeller chamber and the cooling air is suctioned through the air discharge hole and discharged into a shaft front end from the shaft rear end.

However, the above conventional air compressor has a problem that a flow rate of the compressed air is reduced while the compressed air passes through a narrow space near an air foil bearing and an air flow thereof is delayed, and thus self cooling efficiency using the compressed air decreases.

Related Art Document

Patent Document 1: Korean Patent Registration No. 10-1810430 (registered on Dec. 13, 2017)

DISCLOSURE

Technical Problem

The present invention is directed to providing an air compressor for a vehicle, which ensures a circulation flow rate of cooling air and facilitates a flow of the cooling air to improve cooling efficiency.

Aspects of the present invention are not limited to the above-stated aspect and other unstated aspects of the present invention will be understood by those skilled in the art from the following disclosure.

Technical Solution

One aspect of the present invention provides an air compressor for a vehicle. The air compressor includes a compression portion disposed on one side of a rotor to generate compressed air by compressing air which flows therein, a bearing portion configured to support the rotor in a front-rear direction, a cooling circulation flow path configured to allow the compressed air discharged from the compression portion to flow in the bearing portion to cool the bearing portion, and a bypass flow path configured to allow some of the compressed air to bypass at least a part of the bearing portion.

The cooling circulation flow path and the bypass flow path may diverge in front of the bearing portion or at a point where the bearing portion is disposed and may join behind the bearing portion.

Some of the joining compressed air may be discharged outward.

The air compressor may further include a housing configured to accommodate the compression portion, the bearing portion, the cooling circulation flow path, and the bypass flow path.

The housing may include a rear cover disposed behind the rotor.

The rear cover may be a plastic material.

The rear cover may include a discharge hole formed to extend toward the rear of the rotor, and the compressed air may be discharged through the discharge hole.

The rotor may include a rotating shaft coupled to the compression portion, a rotor part coupled to an outer circumferential surface of the rotating shaft, and a rotor disk formed on a rear side of the rotor part.

The bearing portion may include a front air foil bearing and a rear air foil bearing which support a front surface and a rear surface of the rotor disk, respectively.

The cooling circulation flow path and the bypass flow path may diverge between the front air foil bearing and the rear air foil bearing.

The cooling circulation flow path may include a cooling flow path disposed outside the rotor to move some of the air compressed by the compression portion from the front to the rear and a circulation flow path disposed inside the rotor to circulate and supply the air moved from the cooling flow path to the compression portion.

The cooling circulation flow path may further include a chamber disposed between the cooling flow path and the circulation flow path.

The bypass flow path may join the chamber.

The chamber may have a width greater than a width of the cooling flow path or the bypass flow path.

Rotating air which rotates in one direction may be formed in the chamber while the rotating air rotates in a direction from an outlet of the bypass flow path to an inlet of the circulation flow path.

The compressed air which flows into the chamber from the bypass flow path may be transferred to the rear of the chamber due to a flow of the rotating air.

The bypass flow path may come closer to the rotor in a direction toward the chamber.

The chamber may be disposed in the internal of rear cover.

Advantageous Effects

According to the present invention, in an air compressor for a vehicle, since a bypass flow path which bypasses an air foil bearing is additionally installed, a circulation flow rate of compressed air for internal cooling may be secured and circulation of internal compressed air may be facilitated to improve cooling efficiency of cooling air.

According to the present invention, in an air compressor for a vehicle, since rotating air is formed in air inside a chamber in a direction which coincides with a transfer direction, a phenomenon in which still air is formed at a place where a variety of flow paths meet may be prevented and heat exchange with cooling air may be induced near a bearing using the rotating air to improve cooling efficiency of the cooling air.

BEST MODE FOR INVENTION

Hereinafter, an exemplary embodiment of the present invention will be described in detail with reference to the drawings.

However, the technical concept of the present invention is not limited to the embodiments described below and can be implemented in a variety of different forms. One or more components of the embodiments may be selectively combined or substituted with one another without departing from the technical concept of the present invention.

Also, unless particularly defined otherwise, the terms used herein (including technical or scientific terms) may have the same meanings generally understood by those of ordinary skill in the art. Generally used terms such as terms defined in dictionaries may be construed in consideration of the contextual meanings of the related art.

Also, terms used herein are intended to explain the embodiments but not to restrict the present invention.

Throughout the specification, the singular forms include the plural forms as well unless the context clearly indicates otherwise. When at least one (or one or more) of A, B, and C is described, this may include one or more of all combinations of A, B, and C.

Also, in describing components of the embodiments of the present invention, the terms such as first, second, A, B, (a), (b), and the like may be used.

These terms are merely for distinguishing one element from another, and the essential, order, sequence, and the like of corresponding elements are not limited by the terms.

Also, when it is stated that one element is "connected," "coupled," or "joined" to another, the element may not only be directly connected, coupled, or joined to the other element but may also be connected, coupled, or joined to the other element with another intervening element.

Also, when it is stated that an element is formed or disposed "above (on) or below (beneath)" another element, the two elements may not only come into direct contact with each other but one or more other elements may also be formed or disposed between the two elements. Also, being "above (on) or below (beneath)" may include not only being in an upward direction but also being in a downward direction on the basis of one element.

Hereinafter, an air compressor for a vehicle according to one embodiment of the present invention will be described with reference to FIGS. 1 to 5.

Figure 1:
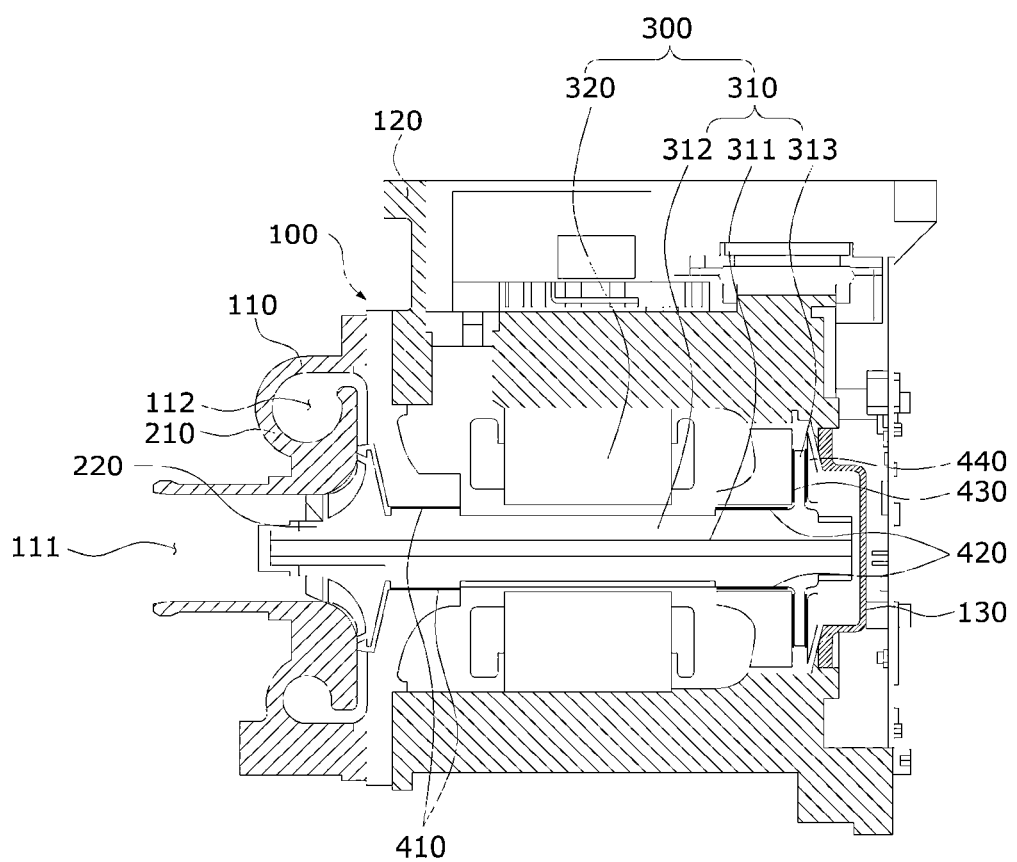
FIG. 1 is a cross-sectional view of an air compressor for a vehicle according to one embodiment of the present invention.
Figure 2:
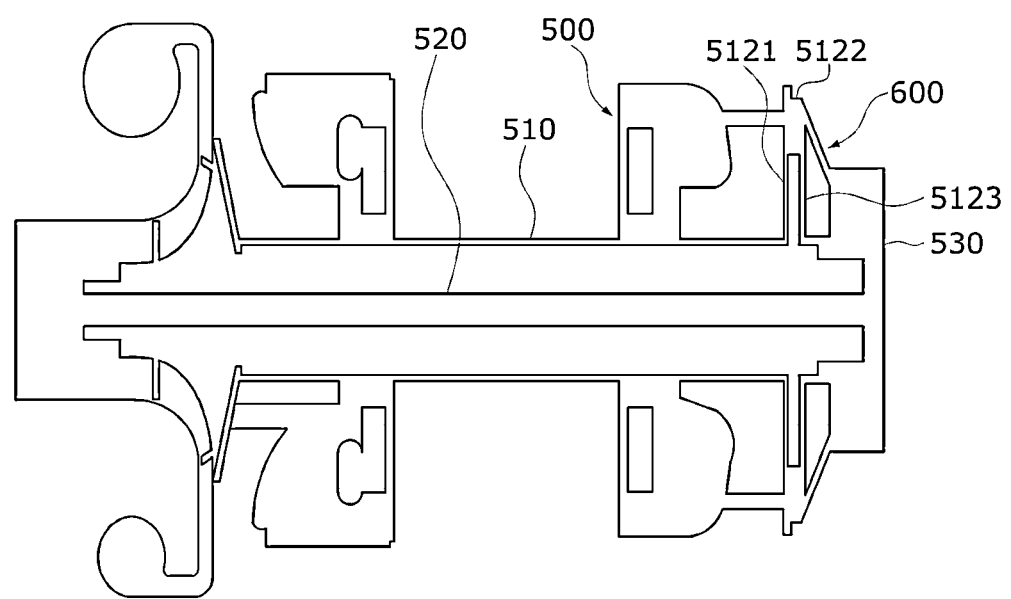
FIG. 2 is a cross-sectional view illustrating a cooling circulation flow path according to one embodiment of the present invention.
Figure 3:
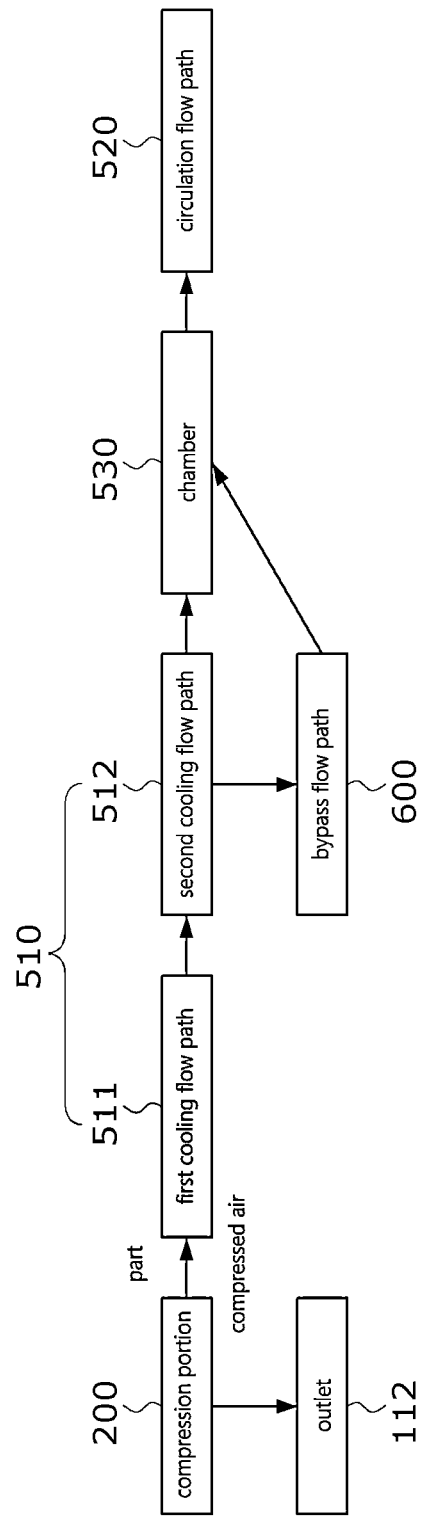
FIG. 3 is a block diagram illustrating a path of compressed air of the air compressor according to one embodiment of the present invention.
Figure 4:
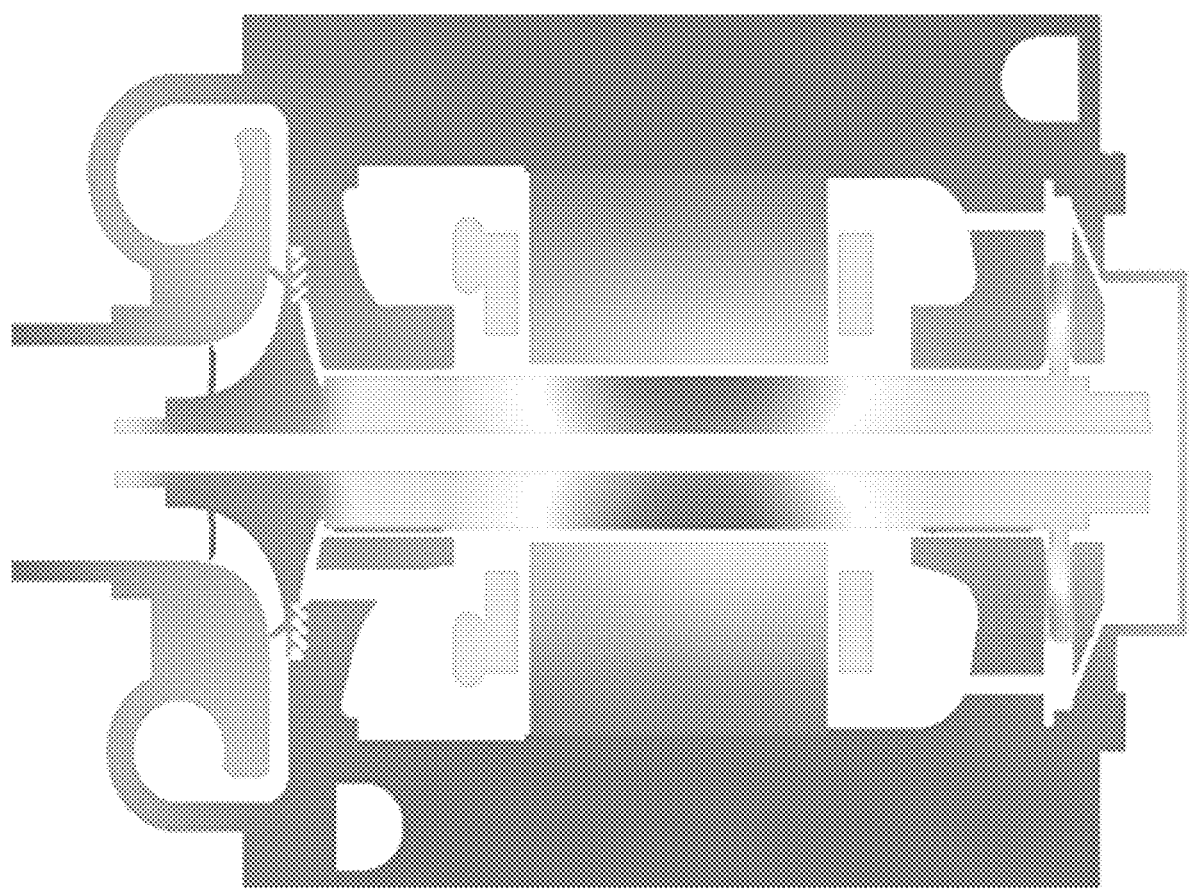
FIG. 4 is a view illustrating heat distribution of the air compressor according to one embodiment of the present invention.
Figure 5:
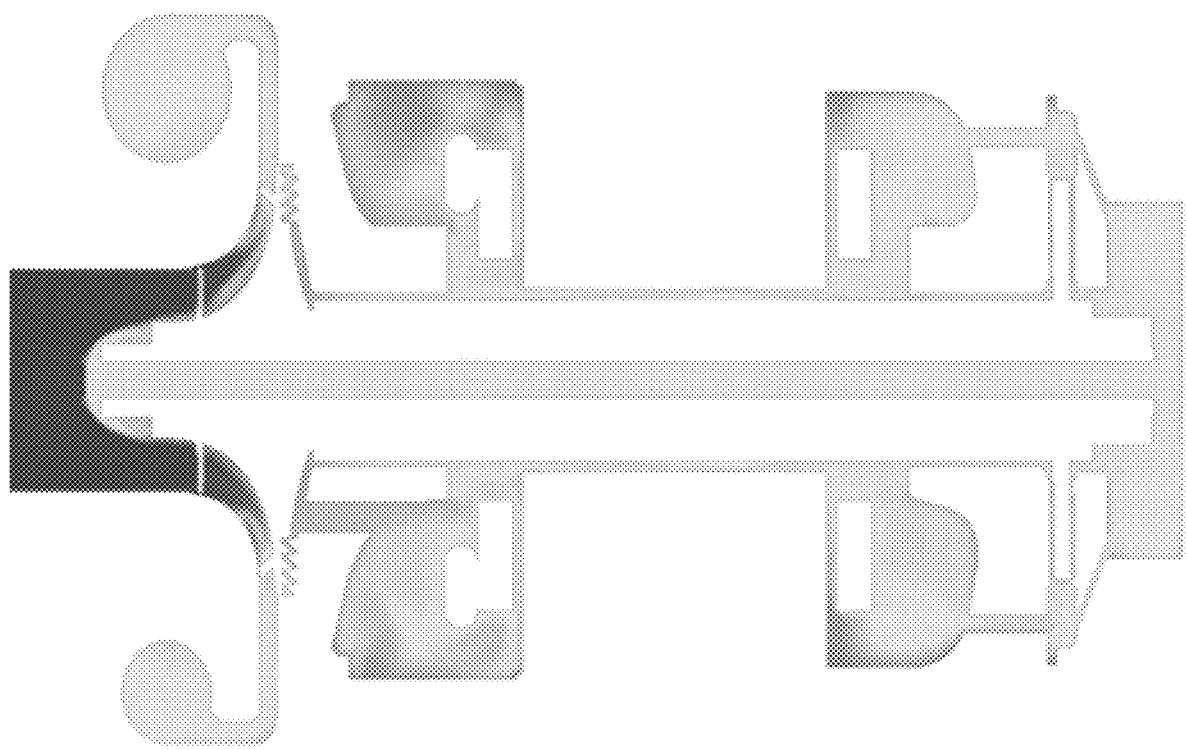
FIG. 5 is a view illustrating heat distribution of the air inside the air compressor according to one embodiment of the present invention.

FIG. 1 is a cross-sectional view of the air compressor according to one embodiment of the present invention, FIG. 2 is a cross-sectional view illustrating a cooling circulation flow path according to one embodiment of the present invention, FIG. 3 is a block diagram illustrating a path of compressed air of the air compressor according to one embodiment of the present invention, FIG. 4 is a view illustrating heat distribution of the air compressor according to one embodiment of the present invention, and FIG. 5 is a view illustrating heat distribution of the air inside the air compressor according to one embodiment of the present invention.

Referring to FIGS. 1 and 2, the air compressor includes a housing 100, a compression portion 200, a driving portion 300, a bearing portion 400, a cooling circulation flow path 500, and a bypass flow path 600.

The housing 100 forms an exterior. The housing 100 accommodates the compression portion 200, the driving portion 300, the bearing portion 400, the cooling circulation flow path 500, and the bypass flow path 600 in an internal space thereof. Here, the housing 100 may include an impeller housing 110, a driving housing 120, and a rear cover 130.

The impeller housing 110 may include an inlet 111 and an outlet 112. Also, the compression portion 200 is disposed in an internal space of the impeller housing 110. Here, air flowing in through the inlet 111 is compressed by the compression portion 200 and discharged outward through the outlet 112. Here, some of the compressed air is supplied to the cooling circulation flow path 500 which will be described below.

The driving housing 120 is connected to a rear end of the impeller housing 110. Here, rearward is a direction toward the driving portion 300 and forward is a direction opposite to the rear on the basis of the compression portion 200. Here, the driving portion 300 is disposed in an internal space of the driving housing 120. Also, the cooling circulation flow path 500 is formed inside the driving housing 120.

The rear cover 130 is connected to a rear end of the driving housing 120. Here, a chamber 530 which will be described below may be disposed in an internal space of the rear cover 130. The rear cover 130 may be a plastic material.

Here, the rear cover 130 may include a discharge hole (not shown) that opens toward a rear side of the air compressor.

The compression portion 200 is disposed in the internal space of the impeller housing 110 and compresses air flowing in through the inlet 111. The compression portion 200 may include a blower 210 and an impeller 220.

The blower 210 is connected to the inlet 111 and has a shape having a gradually reduced cross section to compress air which has flowed therein.

The impeller 220 may be disposed between the inlet 111 and the blower 210. Here, the impeller 220 may transfer the air which has flowed in through the inlet 111 toward the blower 210.

That is, the air which has flowed in through the inlet 111 may be transferred to the blower 210 by the impeller 220 and compressed while passing through the blower 210 having the gradually reduced cross section to generate compressed air. Here, some of the compressed air flows through the cooling circulation flow path 500. Here, the compressed air may perform a function of cooling the inside of the air compressor.

The driving portion 300 is disposed in the internal space of the driving housing 120 and provides the compression portion 200 with a driving force. Here, the driving portion 300 may include a rotor 310 and a stator 320.

The rotor 310 has one side connected to the compression portion 200 and rotates the compression portion 200 while rotating. Here, the rotor 310 may include a rotating shaft 311, a rotor part 312, and a rotor disk 313.

The rotating shaft 311 is coupled to and drives the impeller 230 to rotate.

The rotor part 312 is coupled to an outer circumferential surface of the rotating shaft 311. Here, when external electric power is supplied, the rotor part 312 generates torque due to an electromagnetic interaction with the stator 320. Here, referring to FIGS. 4 and 5, heat is concentrated on the rotor disk 313 and a part where the rotor part 312 and the stator 320 overlap. Also, a temperature of air passing between the rotor part 312 and the stator 320 increases.

The rotor disk 313 is connected to one side of the rotor part 312. A radial length of the rotor disk 313 may be greater than that of the rotor part 312. Here, heat is concentrated on both sides of the rotor disk 313 and on air which comes into contact with both sides of the rotor disk 313.

The stator 320 is disposed outside the rotor 310 and is fixedly installed on an inner circumferential surface of the driving housing 120. Here, outward is a direction toward the housing 100 on the basis of the rotating shaft 311 and inward is a direction opposite the outside.

Meanwhile, although not shown in the drawing, the driving portion may be provided as a clutch (not shown) and may receive a driving force of an engine of a vehicle to operate. The driving portion may include a pulley (not shown), a disk assembly (not shown), a coil assembly (not shown), and the like. Here, the pulley is connected to the engine of the vehicle by a driving belt (not shown), and the driving belt may be installed on an outer circumferential surface of the pulley and may transfer power of the engine of the vehicle to the pulley. Also, the disk assembly may be coupled to a driving shaft (not shown) and may transfer the power of the engine of the vehicle which is transferred from the pulley to the driving shaft. Here, the driving shaft functions as the rotating shaft 311 and is coupled to the impeller 340 to drive the impeller 340 to rotate.

The bearing portion 400 rotatably supports the rotor 310. Here, the bearing portion 400 may include front and rear journal bearings 410 and 420 and front and rear air foil bearings 430 and 440.

The front and rear journal bearings 410 and 420 are disposed on both ends of an outer circumferential surface of the rotor part 312 and support the rotor part 312 to smoothly rotate inside the driving housing 120.

The front and rear air foil bearings 430 and 440 are disposed on a front surface and a rear surface of the rotor disk 313 and support rotation of the rotor disk 313 in an axial direction. Here, referring to FIG. 2, heat is concentrated on parts of the rotor disk 313 which come into contact with the front and rear air foil bearings 430 and 440.

Referring to FIG. 2, the cooling circulation flow path 500 allows some of the air compressed by the compression portion 200 to move in an axial direction and then to circulate through the compression portion 200. Here, the cooling circulation flow path 500 may include a cooling flow path 510 and a circulation flow path 520.

The cooling flow path 510 may be disposed outside the rotor 310. Here, the cooling flow path 510 may be formed by a space between the driving housing 120 and the driving portion 300. The cooling flow path 510 may move some of the air compressed by the compression portion 200 from the front to the rear.

Figure 6:
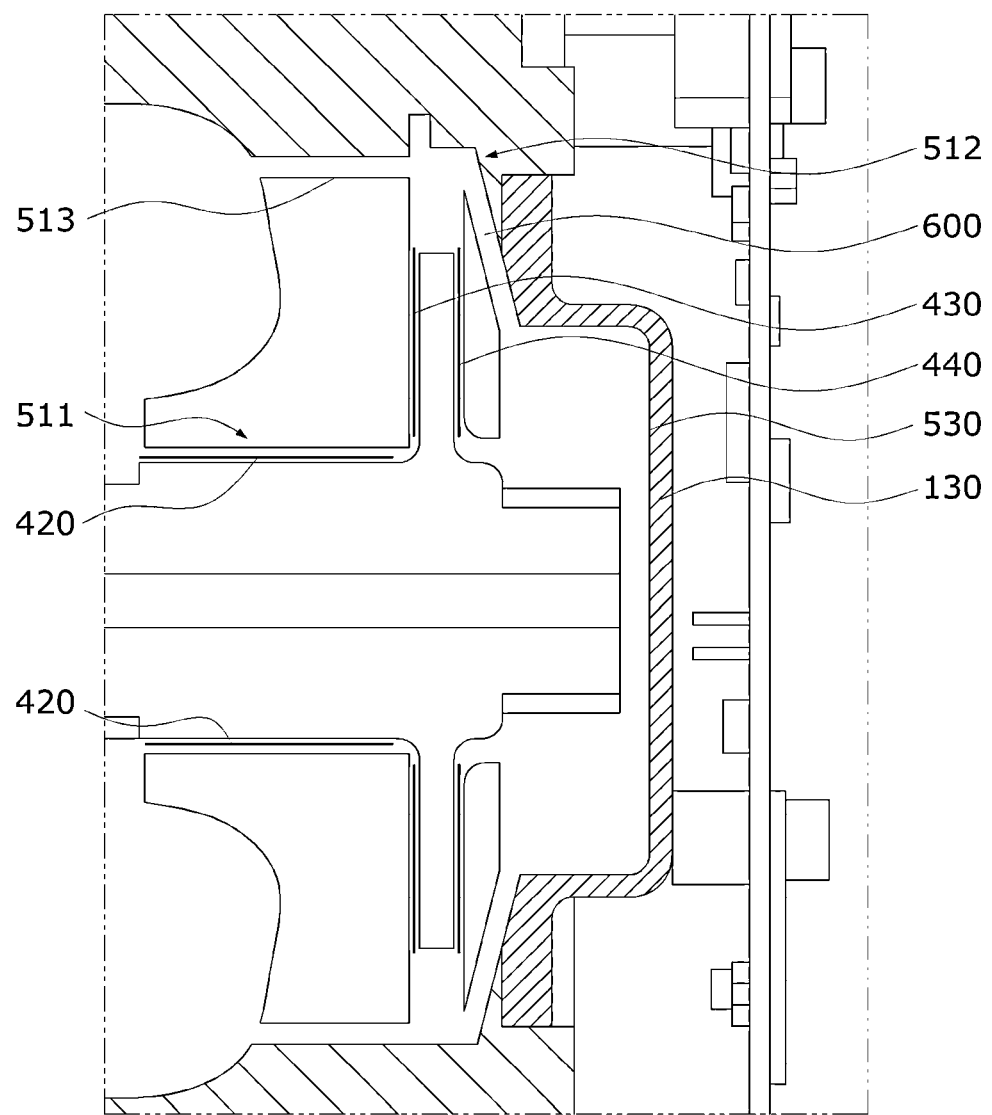
FIG. 6 is an enlarged cross-sectional view illustrating connection parts of a second cooling flow path, a bypass flow path, a chamber, and a circulation flow path of the air compressor according to one embodiment of the present invention.
Figure 7:
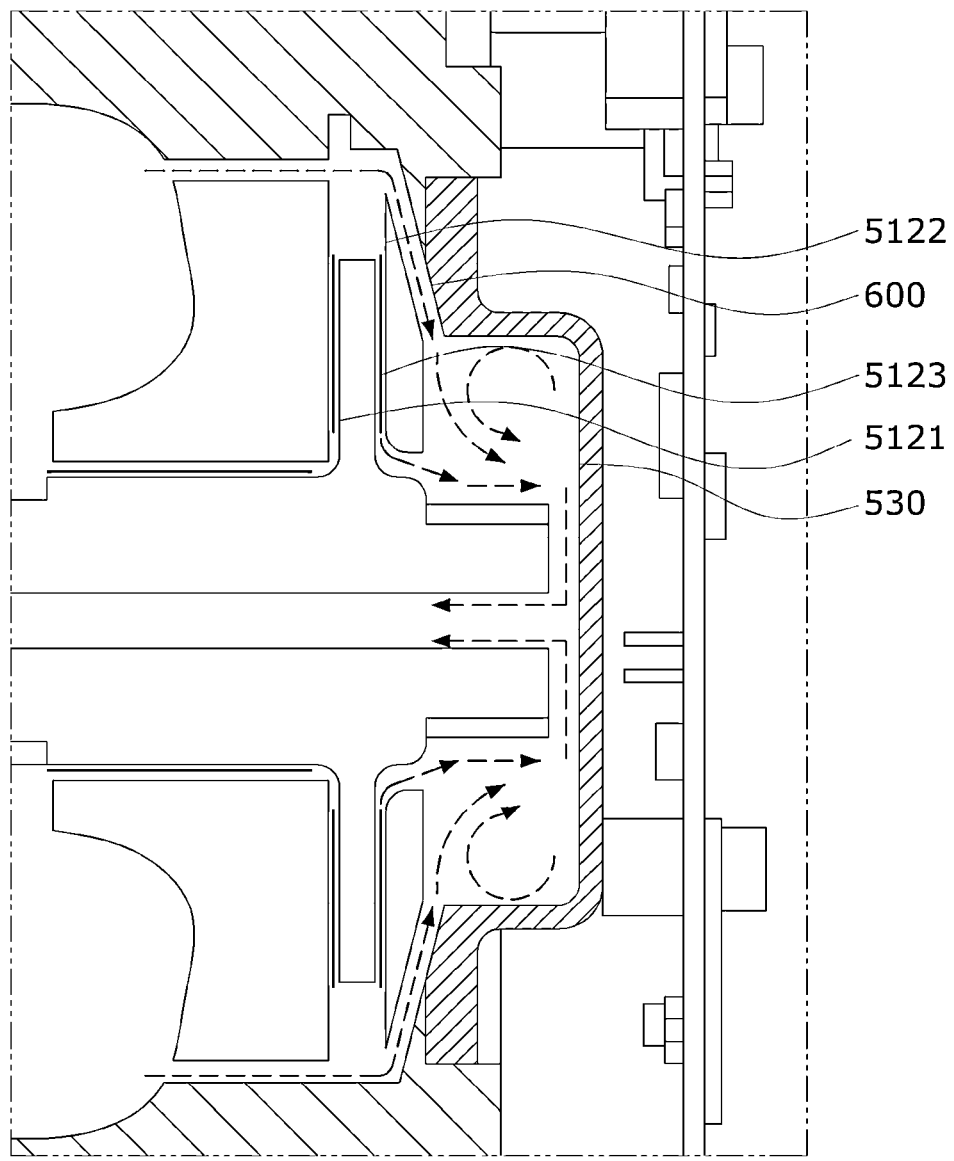
FIG. 7 is a view illustrating air flows at the connection parts of the second cooling flow path, the bypass flow path, the chamber, and the circulation flow path of the air compressor according to one embodiment of the present invention.

FIG. 6 is an enlarged cross-sectional view illustrating connection parts of a second cooling flow path, a bypass flow path, the chamber, and the circulation flow path of the air compressor according to one embodiment of the present invention, and FIG. 7 is a view illustrating air flows at the connection parts of the second cooling flow path, the bypass flow path, the chamber, and the circulation flow path of the air compressor according to one embodiment of the present invention.

Referring to FIGS. 2 and 6, the cooling flow path 510 may include a first cooling flow path 511 and a second cooling flow path 512.

The first cooling flow path 511 surrounds an outer surface of the rotor part 312 and the front and rear journal bearings 410 and 420 and passes the compressed air to cool heat generated at the rotor part 312, the front and rear journal bearings 410 and 420, and the stator 320.

Also, the second cooling flow path 512 surrounds an outer surface of the rotor disk 313 and outer surfaces of the front and rear air foil bearings 430 and 440 and passes the compressed air to cool heat generated at the rotor disk 313 and the front and rear air foil bearings 430 and 440.

Referring to FIGS. 6 and 7, the second cooling flow path 512 may include a first area 5121, a second area 5122, and a third area 5123.

The first area 5121 surrounds the front surface of the rotor disk 313 and the front air foil bearing 430 and cools heat generated on the front surface of the rotor disk 313 and the front air foil bearing 430.

The second area 5122 surrounds a side surface of the rotor disk 313 and cools heat generated on the side surface of the rotor disk 313.

The third area 5123 surrounds the rear surface of the rotor disk 313 and the rear air foil bearing 440 and cools heat generated on the rear surface of the rotor disk 313 and the rear air foil bearing 440.

Also, the cooling flow path 510 may further include a third cooling flow path 513 configured to bypass the rear journal bearing 420 and connect the first cooling flow path 511 to the second cooling flow path 512.

The circulation flow path 520 may be disposed inside the rotor 310. The circulation flow path 520 may be formed by a hollow of the rotating shaft 311. The circulation flow path 520 may be connected to a rear end of the cooling flow path 510 and may receive and circulate air moved from the cooling flow path 510 to supply the air to the inlet 111.

Also, the cooling circulation flow path 500 may further include the chamber 530 connected between the cooling flow path 510 and the circulation flow path 520.

The chamber 530 transfers the air moved from the cooling flow path 510 to the circulation flow path 520. Here, air turbulence may occur in the chamber 530.

On the other hand, the compressed air joining from the cooling flow path 510 and the bypass flow path 600 may be discharged rearward from the air compressor through the discharge hole of the rear cover 130.

The bypass flow path 600 receives some of the air passing through the cooling circulation flow path 500 and allows the air to bypass a part of the bearing portion 400 and to join the cooling circulation flow path 500.

The cooling circulation flow path 500 and the bypass flow path 600 may diverge in front of the bearing portion 400 or at a point at which the bearing portion 400 is disposed. Here, the cooling circulation flow path 500 and the bypass flow path 600 may join each other behind the bearing portion 400.

Here, the cooling circulation flow path 500 and the bypass flow path 600 may diverge between the front air foil bearing 430 and the rear air foil bearing 440.

In more detail, the bypass flow path 600 may diverge from the second area 5122. Here, referring to FIG. 5, the air passing through the bypass flow path 600 may bypass the rear air foil bearing 440 and join the cooling circulation flow path 500.

The bypass flow path 600 may increase a circulation flow rate of the cooling air in the compressor and relieve a phenomenon in which an air flow is delayed in a section near the air foil bearings to facilitate circulation of the compressed air therein and increase internal cooling efficiency.

Also, the bypass flow path 600 may join the chamber 530. Here, the bypass flow path 600 may come closer to the rotor 310 in a direction toward the chamber 530.

Here, a connection point of the chamber 530 and the bypass flow path 600 may be spaced further apart from the rotor 310 than a connection point of the chamber 530 and the cooling flow path 510. Also, the chamber 530 may have a width greater than a width of the cooling flow path 510 or the bypass flow path 600.

Here, referring to FIG. 7, the air which has flowed into the chamber 530 from the cooling flow path 510 collides with an inner wall of the rear cover 130 and moves to the vicinity of a corner. Also, the air may move toward an outlet of the cooling flow path 510 and an outlet of the bypass flow path 600 along the inner wall of the rear cover 130. Accordingly, inside the chamber 530, rotating air which rotates in one direction may be formed. Here, the rotating air rotates to sequentially pass through the outlet of the bypass flow path 600, the outlet of the cooling flow path 510, and an inlet of the circulation flow path 520. Here, the air which has flowed into the chamber 530 from the bypass flow path 600 is transferred to the rear of the chamber 530 along a flow of the rotating air, and thus a speed of flowing into the circulation flow path 520 may be increased.

With this configuration, the air which rotates in the chamber 510 can facilitate an air flow at the connection points of the cooling flow path 510, the circulation flow path 520, and the bypass flow path 600 and increases heat exchange efficiency of the compressed air near the bearings to improve cooling efficiency of the air compressor.

Although an exemplary embodiment of the present invention has been described above, it may be understood by those skilled in the art that a variety of modifications and changes of the present invention may be made without departing from the concept and scope of the present invention which are disclosed in the following claims.

DESCRIPTION OF REFERENCE NUMERALS

| | |
|---|---|
| 100: housing | 110: impeller housing |
| 120: driving housing | 130: rear cover |
| 200: compression portion | 210: blower |
| 220: impeller | 300: driving portion |
| 310: rotor | 311: rotating shaft |
| 312: rotor part | 313: rotor disk |
| 320: stator | 400: bearing portion |
| 410: front journal bearing | 420: rear journal bearing |
| 430: front air foil bearing | 440: rear air foil bearing |
| 500: cooling circulation flow path | 510: cooling flow path |
| 511: first cooling flow path | 512: second cooling flow path |
| 513: third cooling flow path | 520: circulation flow path |
| 530: chamber | 600: bypass flow path |

What is claimed is:

1. An air compressor for a vehicle, comprising:
   a compression portion disposed on one side of a rotor to generate compressed air by compressing air which flows therein;
   a bearing portion configured to support the rotor in a front-rear direction;
   a cooling circulation flow path configured to allow the compressed air discharged from the compression portion to flow in the bearing portion to cool the bearing portion; and
   a bypass flow path configured to allow the compressed air to bypass at least a part of the bearing portion,
   wherein the cooling circulation flow path comprises a cooling flow path disposed outside the rotor to move some of the air compressed by the compression portion from a front of the air compressor to a rear of the air compressor; and a circulation flow path disposed inside the rotor to circulate and supply the air moved from the cooling flow path to the compression portion, wherein the cooling circulation flow path further comprises a chamber disposed between the cooling flow path and the circulation flow path, wherein the bypass flow path extends toward the rotor in a direction toward the chamber.

2. The air compressor of claim 1, wherein the cooling flow path and the bypass flow path diverge at a point where the bearing portion is disposed and wherein the bypass flow path discharges into the chamber.

3. The air compressor of claim 2, wherein the cooling flow path discharges into the chamber.

4. The air compressor of claim 2, wherein at least some of the air in the chamber is supplied to the compression portion through the circulation flow path.

5. The air compressor of claim 1, further comprising a housing configured to accommodate the compression portion, the bearing portion, the cooling circulation flow path, and the bypass flow path.

6. The air compressor of claim 5, wherein the housing comprises a rear cover disposed behind the rotor.

7. The air compressor of claim 6, wherein the rear cover is a plastic material.

8. The air compressor according to claim 6, wherein the rear cover comprises at least one discharge hole formed to extend rearward, and wherein the compressed air is discharged through the at least one discharge hole.

9. The air compressor according to claim 6, wherein the chamber is disposed internal to the rear cover.

10. The air compressor of claim 1, wherein the rotor comprises:

a rotating shaft coupled to the compression portion;

a rotor part coupled to an outer circumferential surface of the rotating shaft; and a rotor disk formed on a rear side of the rotor part.

11. The air compressor of claim 10, wherein the bearing portion comprises a front air foil bearing and a rear air foil bearing which support a front surface and a rear surface of the rotor disk, respectively.

12. The air compressor of claim 1, wherein the bypass flow path joins the chamber.

13. The air compressor of claim 12, wherein the chamber has a width greater than a width of the cooling flow path or the bypass flow path.

* * * * *